Jan. 3, 1950 A. P. EMMERT 2,493,240
HYDRODYNAMIC COUPLING
Filed April 23, 1945 2 Sheets-Sheet 1
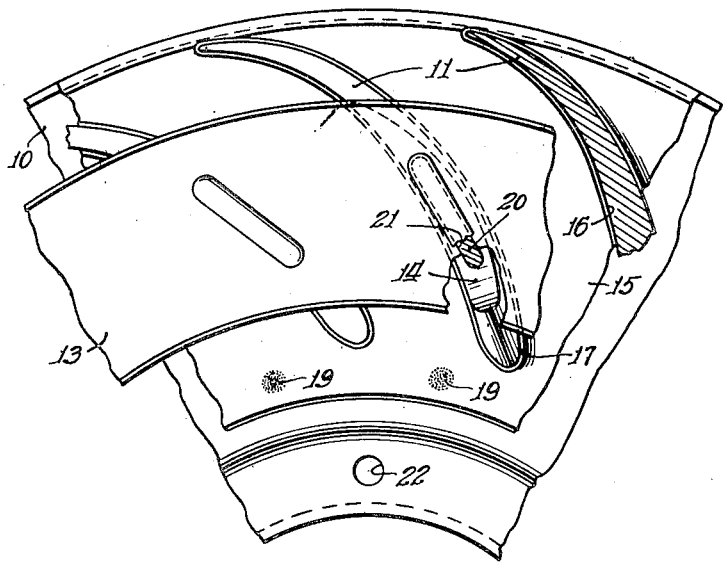
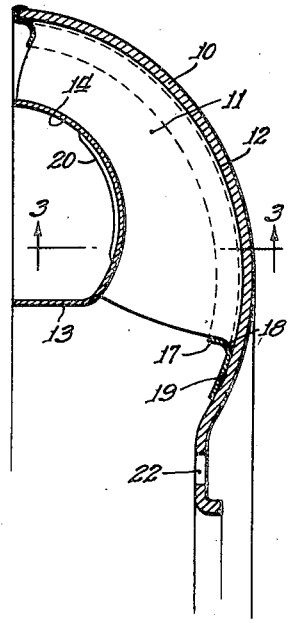
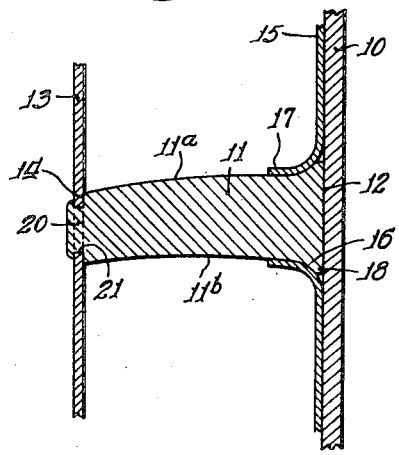
Inventor:
Arthur P. Emmert

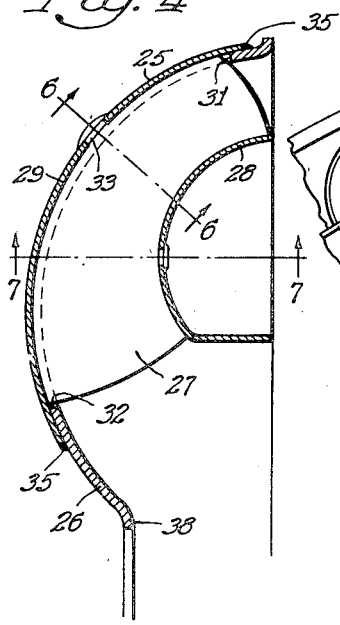
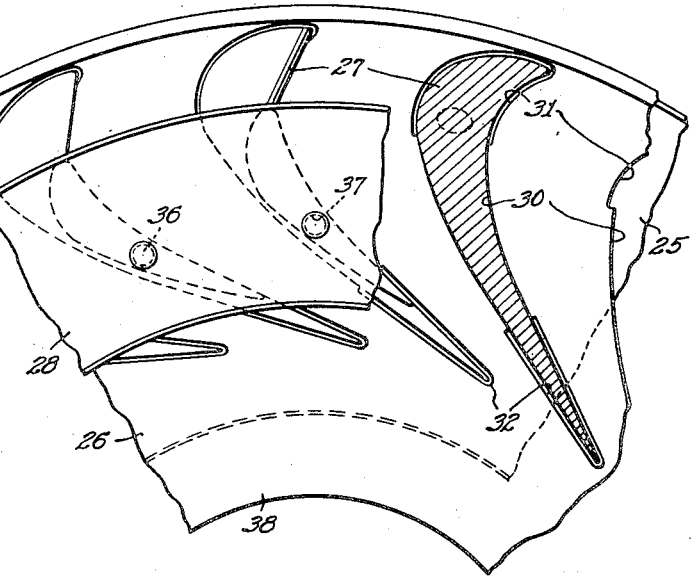
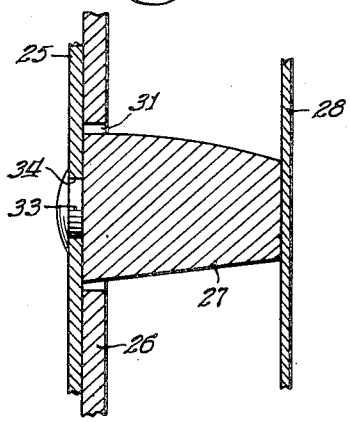
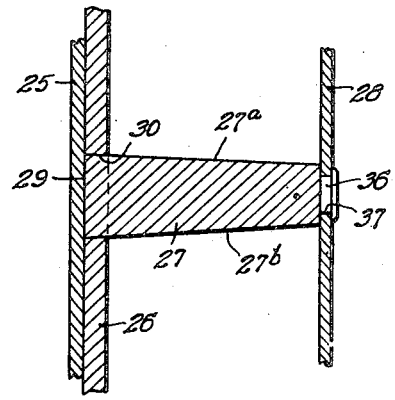

Patented Jan. 3, 1950

2,493,240

UNITED STATES PATENT OFFICE 2,493,240

HYDRODYNAMIC COUPLING

Arthur P. Emmert, Muncie, Ind., assignor to Borg-Warner Corporation, Chicago, Ill., a corporation of Illinois Application April 23, 1945, Serial No. 589,889

7 Claims. (Cl. 103—115)

My invention relates to hydrodynamic coupling devices and more particularly to such coupling devices which function to multiply the torque between an input and an output shaft.

Hydrodynamic coupling devices generally comprise a plurality of vaned members including a driving member and a driven member the drive between which is through a body of liquid. The vanes of these members impart energy to and receive energy from the body of liquid. A fluid coupling which is not intended to multiply torque generally includes only two elements while a hydrodynamic torque converter includes at least three vaned elements, a stator element which has a reaction force impressed thereon by the fluid and is held from rotation being the third element. Such hydrodynamic torque converters are shown, for example, in Schneider et al. Patent No. 2,306,758, and Schneider et al. Patent No. 2,333,680.

Considerable difficulty has been experienced in the past in assembling these hydrodynamic coupling devices and in particular these devices of the torque converter type. The vanes in the driving and driven elements of the non-torque converting type are generally flat pieces of metal which are relatively simple to attach to the driving and driven members; however, the vanes in the members of a torque converting hydrodynamic device generally are curved and differ in thickness throughout their length and breadth. It has been found that the vanes of a torque converting hydrodynamic device may be made expeditiously by casting; however, this type of vane has proved quite difficult to attach to the driving, driven or stator members of the torque converter. This is particularly true when the vanes are of a metal such as aluminum which cannot be welded very well to these members, which are preferably steel stampings.

It is an object of my invention to provide an improved arrangement and method for attaching the vanes to the members of a hydrodynamic coupling device, and it is more specifically an object to provide such an arrangement and method which is particularly advantageous for use with the curved vanes of different cross-sectional thickness used in a torque converter.

It is another object of my invention to provide such an arrangement and method by means of which the vanes may be mechanically attached to a hydrodynamic coupling element without the necessity of welding the vanes thereto. It is contemplated that the vanes may be of a metal such as aluminum which is easily cast, while the elements to which the vanes are to be attached are of a different metal, such as steel, to which it is comparatively difficult to weld the vanes.

It is still more particularly an object of my invention to utilize a shell fitting within the outer casing of the hydrodynamic coupling element through which shell the vanes extend and which has portions on the edges of the openings for receiving the vanes overlying base portions of the vanes for clamping the vane to the outer casing. With this arrangement it is contemplated that the vane preferably be located in the shell prior to a positioning of the shell in the casing, so that when the shell is finally positioned, the vanes are held clamped in place by the shell.

The invention consists of the novel constructions, arrangements, devices, processes and methods to be hereinafter described and claimed for carrying out the above stated objects and such other objects as will appear from the following description of certain preferred embodiments and methods for making the same illustrated with reference to the accompanying drawings, wherein:

Fig. 1 is a cross-sectional view of a portion of an impeller or driving element of a hydrodynamic torque converter illustrating one embodiment of the invention;

Fig. 2 is an elevational view of the impeller as seen from the left in Fig. 1 or from the inner side of the impeller;

Fig. 3 is a sectional view on an enlarged scale taken on line 3—3 of Fig. 1 in the direction indicated;

Fig. 4 is a cross-sectional view of a portion of a turbine or driven element of a torque converter illustrating another embodiment of the invention;

Fig. 5 is an elevational view of the turbine element as seen from the right in Fig. 4 or from the innerside of the element;

Fig. 6 is a sectional view on an enlarged scale taken on line 6—6 in Fig. 4 in the direction indicated; and Fig. 7 is a sectional view also on an enlarged scale taken on line 7—7 in Fig. 4 in the direction indicated.

Like characters of reference designate like parts in the several views.

Referring now to the drawings and in particular to Figs. 1, 2 and 3, the illustrated hydrodynamic torque converter impeller element is seen to comprise an outer casing member 10. The casing member 10 is a hollow shell and is annular, although only a portion of the complete shell is shown. A plurality of impeller blades or vanes 11 are disposed within the casing member and are in contact with the casing member at the base edges 12 of the vanes. An inner core ring 13 is disposed in contact with the vanes on their opposite edges 14, and this core ring is also a complete annulus and is concentric with the annular casing member 10. Although just a limited number of vanes 11 are illustrated, it will be understood that the vanes are equally spaced around the casing member 10 and inner core ring 13 for the entire circular lengths of the core ring and casing member.

The vanes 11 are located in the casing member 10 in their proper equally spaced relation by means of a shell 15 which fits within the member 10. The shell 15 is provided with a plurality of openings 16 therein through which the vanes 11 extend, and the openings 16 are so disposed so as to hold the vanes in their proper location. The shell 15 at the edges of its openings 16 is provided with flanges 17 as shown. The vanes 11 taper inwardly to a reduced cross-sectional thickness from the base edges 12 and at their base edges are provided with sidewardly extending flanges 18, as is shown particularly in Fig. 3. The flanges 17 of the shell 15 overlie the flanges 18 on the vanes 11 and overlie the tapered sides 11a and 11b of the vanes, and the vanes are thereby held within the casing member 10. The shell 15 is welded to the casing member 10 as at 19, and the shell, the vanes and the casing member 10 are thus made unitary, inasmuch as the flanges 17 function to prevent movement of the vanes outwardly of the shell 15.

The vanes 11 are each provided with projections 20 which extend through openings 21 in the inner core ring 13, and the projections are riveted over to fix the core ring to the vanes and thereby to the casing member 10 to form the complete impeller element. The casing member 10 near its inner edge is provided with a plurality of openings 22, and the impeller element is thereby adapted to be attached to any suitable driving hub (not shown) or the like for driving the impeller element.

The casing member 10, the shell 15 and the core ring 13 are preferably stamped from sheet steel while the vanes 11 are preferably cast in aluminum, for example. The impeller element is assembled by first inserting the vanes 11 into and through the openings 16 in the shell 15 while the shell is free of the casing member 10 to bring the flanges 18 of the vanes into contact with the flanges 17, substantially in the relative positions of the shell and vanes illustrated in Fig. 3. The shell 15, holding the vanes 11, and the casing member 10 are thereafter brought together to fit the shell 15 in the casing member substantially as it is shown in the drawing, and the shell is then fixed, as by welding, to the casing member. The vanes 11 are thereby fixed within the shell 15 and casing member 10. The core ring 13 is thereafter placed in position with the projections 20 on the vanes 11 extending through the openings 21 in the core ring, and the projections are riveted over so as to fasten the core ring to the vanes and thereby to the casing member 10.

Another embodiment of the invention is illustrated in Figs. 4 to 7 in connection with a turbine or driven element of a hydrodynamic torque converter. The driven element comprises an outer hollow annular casing member 25, an annular shell 26 fitting within the casing member, vanes 27 disposed within the shell and casing member and a core ring 28. The base edges 29 of the vanes 27 are in contact with the casing member 25, and the core ring 28 is in contact with the opposite or inner edges of the vanes, as shown. The vanes 27 taper inwardly from their bases as shown in Fig. 7 similar to the vanes 11 in the first embodiment of the invention, and the shell 26 is provided with openings 30, the edges of which, in the central portions of the vanes as shown in Fig. 7, fit closely about the tapering sides 27a and 27b of the vanes. No flanges corresponding to the flanges 18 in the first embodiment are provided; however, due to the tight fit and the tapering sides of the vanes, the shell 26 functions to hold the vanes in the shell and casing member. Clearances 31 and 32 are provided between the shell 26 and the vanes 27 at the ends of the vanes, and the shell 26 preferably fits tightly about the vanes only in the central portions of the vanes. The clearances have been provided due to the fact that it is very difficult to provide the proper openings in the shell for a good fit with the vanes at the ends of the blades due to the curvature of the casing member and shell.

Although the shell 26 holds the vanes 27 within the shell and casing member 25, in this embodiment projections 33 extending through openings 34 in the casing member 25 are provided to act as additional holding means. These projections are riveted over the casing member 25, as shown. The shell and casing member are welded together, as at 35. The vanes 27 are provided on their inner edges with projections 36 which extend through openings 37 in the core ring 28, and these projections are riveted over to fix the core ring to the vanes and thereby to the shell 26 and casing member 25. In this embodiment, the inner shell 26 instead of the outer casing member, as in the first embodiment, is extended inwardly to form an attaching flange 38 for coupling the turbine element to any suitable hub (not shown); however, it is understood that either the outer casing member or the inner shell may be used for this purpose.

This embodiment of the invention is assembled in a manner quite similar to that in which the first embodiment is assembled. The vanes 27 are first placed in the openings 30 of the shell 26 from the outer or convex side of the shell, and the casing member 25 and shell 26 are then brought together into proper relation with the projections 33 on the vanes extending through the openings 34 in the casing member 25, and the casing member and shell 26 are welded together. The projections 33 are then riveted over to form additional means for holding the vanes within the shell and casing member in addition to the tapered sides of the openings 30 fitting tightly about the vanes. The core ring 28 is then placed in proper relation on the inner edges of the vanes 27 with the projections 36 extending through the openings 37, and the projections 36 are then riveted over to fasten the core ring to the vanes.

The inner shells 15 and 26 disposed in the outer casing members 10 and 25 in the two illustrated embodiments of the invention advantageously have a two-fold function. Firstly, the openings in the shells through which the vanes extend function to properly locate the vanes in the shells and the casing members in an equally spaced relation and in their proper angular dispositions relative to the shells and casing members. Secondly, the shells 15 and 26 function to fix the vanes within the shells and casing members so that additional means may not be used, unless desired, for holding the vanes therein.

I wish it to be understood that my invention is not to be limited to the specific constructions of hydrodynamic couplings and to the specific methods for making the same which are shown and described, except only insofar as the claims may be so limited, as it will be apparent to those skilled in the art that changes may be made without departing from the principles of the invention. In particular I wish it to be understood that the invention is not to be limited to torque converting couplings to the exclusion of non-torque converting couplings, unless the claims are so limited. Furthermore I wish it to be understood that although the first embodiment of the invention is illustrated in Figs. 1 to 3 in connection with an impeller element and the second embodiment of the invention is illustrated in Figs. 4 to 7 in connection with a turbine element, the first embodiment may be used in connection with a turbine element or any other vaned element of a hydrodynamic coupling and the second embodiment may be used in connection with an impeller element or any other vaned element of a hydrodynamic coupling.

I claim:

1. In a hydrodynamic coupling element, the combination of a hollow casing member, a plurality of spaced relatively rigid vanes within said member, and a shell fitting within said member, said shell having openings therein for receiving said vanes for properly locating the vanes within the shell and hollow member, each of said vanes having surfaces at opposite sides of its end adjacent said member diverging toward the latter and engaging complementary surfaces defining the opening in said shell receiving the vane whereby to provide a wedge interlock between the vane and shell preventing movement of the vane away from said shell.

2. A hydrodynamic coupling element comprising in combination, a hollow annular casing member, a plurality of spaced relatively rigid vanes within said member and each having one end thereof abutting said member, and an annular shell fitting within said member, said shell having openings therein for receiving said vanes for properly locating the vanes within the shell and hollow member, each of said vanes having its said end connected to the walls of the opening of said shell receiving the same by a wedge interlock adapted to prevent movement of the vane inwardly of said shell and member and providing the sole means for preventing said movement.

3. In a hydrodynamic coupling element, the combination of a hollow casing member, a plurality of spaced rigid metallic vanes within said member, and a metallic shell fitting within and fixed to said member, said shell having inwardly flanged openings therein for receiving said vanes and overlapping said vanes at its said openings for properly locating the vanes within the shell and member and frictionally engaging said vanes for interlocking the latter to said shell.

4. In a hydrodynamic coupling element, the combination of a hollow casing member, a plurality of spaced vanes within said member, and a shell fitting within and fixed to said member and having inwardly flanged openings therein for receiving said vanes, said vanes being tapered from their base edges adjacent said member to their opposite edges and said shell at said openings overlapping the tapered faces of said vanes for thereby fixing the vanes within the shell and member.

5. A hydrodynamic coupling element comprising in combination, a hollow annular casing member, a plurality of spaced vanes within said member, and an annular shell fitting within said member, said shell having openings therein for receiving said vanes, said openings providing a clearance between the vanes at their ends and the shell and overlapping the vanes intermediate the ends of the vanes for thereby fixing the vanes within the shell and hollow member.

6. A hydrodynamic coupling element comprising in combination, a hollow annular casing member, a plurality of spaced vanes within said member, an annular shell fitting within said member, said shell having openings therein for receiving said vanes and overlapping base edges of the vanes at the edges of said openings for fixing the vanes within the shell and member, and an inner core ring in contact with the opposite edges of said vanes and riveted to the vanes, said vanes also being riveted to said casing member.

7. A hydrodynamic coupling element comprising in combination, a hollow annular casing member, a plurality of spaced rigid metallic vanes within said member and each having an end in engagement with said member, an annular metallic shell fitting within said member and fixed thereto, said shell having openings therein for receiving said ends of said vanes, each of said vanes being disposed in a plane at one side of said member and having surfaces on opposite sides of its end, received within the opening in said shell, in diagonal relation to each other and diverging toward said member, said surfaces engaging complementary surfaces on the walls of the associated shell opening and adapted to provide a frictional connection between said shell and vane to prevent movement of said vane inwardly of said shell and said member and to fix said vanes to said shell.

ARTHUR P. EMMERT.

REFERENCES CITED

The following references are of record in the file of this patent:

UNITED STATES PATENTS

| Number | Name | Date |
| --- | --- | --- |
| 2,295,926 | Boesger | Sept. 15, 1942 |
| 2,302,095 | Bartch | Nov. 17, 1942 |
| 2,315,235 | Weidner et al. | Mar. 30, 1943 |

FOREIGN PATENTS

| Number | Country | Date |
| --- | --- | --- |
| 365,817 | Great Britain | Jan. 28, 1932 |